United States Patent [19]
Nachtigal

[11] Patent Number: 5,866,855
[45] Date of Patent: Feb. 2, 1999

[54] GENERAL PURPOSE BELT SCALE

[75] Inventor: Chester L. Nachtigal, Seattle, Wash.

[73] Assignee: Engineering Services and Systems, Inc., Seattle, Wash.

[21] Appl. No.: 898,641

[22] Filed: Jul. 22, 1997

[51] Int. Cl.⁶ .......................... G01G 19/00; G01G 21/10
[52] U.S. Cl. ...................... 177/145; 177/187; 177/DIG. 9
[58] Field of Search .............................. 177/16, 145, 187, 177/188, DIG. 9

[56] References Cited

U.S. PATENT DOCUMENTS

| | | | |
|---|---|---|---|
| 4,260,034 | 4/1981 | Randolph, Jr. ........................... | 177/211 |
| 4,557,341 | 12/1985 | Solderholm ................................ | 177/16 |
| 5,111,896 | 5/1992 | Porcari et al. ............................. | 177/16 |
| 5,296,654 | 3/1994 | Farley et al. .............................. | 177/145 |

Primary Examiner—Randy W. Gibson

[57] ABSTRACT

A general purpose belt scale for measuring the weight of material being transported on a conveyor belt includes a pair of load beams, each having a load cell in combination with a force and torque isolator mechanism that isolates the load cell from disturbance forces and torques that would increase the measurement errors. Absence of a crossbar enables the two independent load beams to fit a wide variety of belt widths. Selection of the capacity of the load cells after the weighing application has been determined completes the general applicability of the belt scale for both belt width and load weighing requirements. An alternative embodiment of a selectable mounting location for the load cell within each load beam allows the weight capacity of the belt scale to be varied without changing the load cell's weight capacity. The hinge axis of each load beam is preferably matched to a plane passing just slightly above the carry roll axle; and provisions for this matching in the field at installation are provided for in the invention. Additionally, a threaded mounting bolt and nut arrangement enables simple height adjustment so that the weigh idler carry roll can be matched with adjacent idler carry rolls at the time of field installation.

15 Claims, 8 Drawing Sheets

Load Cell Force = $\dfrac{L2}{L1}$ x Material Load

GENERAL PURPOSE BELT SCALE

FIELD OF INVENTION

This invention relates to conveyor belt weighing systems, and more particularly, to the mechanical structure and its weight-sensitive devices that supports a short section of the belt with its material loading.

BACKGROUND OF INVENTION AND PRIOR ART

The need for accurately measuring both the rate of material weight transported by a conveyor belt as well as the totalized weight that has been transported past the scale has long been recognized. Materials transported by conveyor belts and consequently needing to be measured range from huge flow rates encountered in the mining and aggregate production industries to comparatively miniscule flow rates in the sanitary foods and pharmaceuticals industries. Displayed flow rate is very useful and necessary to afford a plant operator the needed information in order to maximize his production rate by making appropriate changes as needed. Totalized weight is needed in order to provide data on plant yield and productivity over a period of time, such as one shift or one 24-hour day. Both of these data are generally available in currently available belt scales.

A related need for measuring flow rates of materials transported by conveyor belts is in a machine called a weigh belt feeder, where the purpose of this machine is to deliver a flow rate slaved to another requirement, such as feeding granulated coal to the steam boiler of an electric power plant. Here the demand for electric power dictates the coal flow rate. The belt scale plays the role of a flow rate measurement device so that the plant control system has the necessary information to change this flow rate as needed to meet the momentary and changing demand for electric power. Both the need for totalized weight and the need for flow rate require similar components for the belt scale—a mechanical structure equipped with one or more weight measuring devices that supports a short section of the loaded belt and produces a signal indicative of the magnitude of the load, a belt motion measuring device, and an electronic signal processor that combines the weight and motion signals and computes totalized weight, belt speed, and material weight flow rate.

All three sets of components contribute to the accuracy of the entire belt scale. However, it has generally been recognized that the greatest increase in belt scale accuracy requires design improvements of the mechanical structure with its weighing devices. At the same time, simplification of the mechanical structure has also received attention in the prior art as witnessed by U.S. Pat. Nos. 4,260,034, 5,111,896, and 5,296,654. These patents all show belt scales without a structural crossbar member that, if present, would span the conveyor from one side to the other. But simplification and reduction of the belt scale's mechanical structure is normally accompanied by increases in errors of the weighing performance. This mechanical structure and its attendant weighing device or devices will henceforth be called 'weighframe' in this patent application. The weighing devices will be referred to as 'load cells'. The assembly comprised of one horizontal roll (carry roll) and two inclined (troughed) rolls, and appropriate framework to connect all three rolls is variously called 'idler' or 'idler assembly' or 'three-roll idler'. The particular idler supported by the weighframe is called the weigh idler.

At least two categories of belt scale accuracy are sought in the industrial application of belt scales: (a) highest accuracy for belt scales that are used to determine quantity of goods sold or exchanged; (b) lesser accuracy for belt scales that measure in-plant inventory and production rates. By far the largest number of belt scales are needed in category (b) where simplicity, general purpose usefulness, and low cost are the most important criteria. Accuracy most be preserved and improved if possible, but is not as demanding as in category (a). It is this later category that this invention addresses, both in terms of reducing mechanical structure as well as maintaining greatest possible accuracy while substantially achieving the goals of category (b). factors such as ease of installation, no interferences with existing cross-braces of the conveyor, ease of alignment, no moving parts in the weighing mechanism, long life, and general-purpose application while still maintaining a satisfactory level of accuracy are all important considerations to the user of a belt scale. The manufacturer of belt scales on the other hand has been traditionally concerned with ease of manufacturing, lowest production cost commensurate with intended accuracy, and ability to manufacture in advance of the specific order from a customer. Because conveyor belts are extant in many different widths, and a wide variety of full-scale material loading, a manufacturer has to inventory a very large number of weighframes if the design dictates that each belt width and each belt loading range requires a separate weighframe.

Eliminating the need for a crossbar would greatly enhance the ability to manufacture and stock this equipment in advance of orders for them because belt width would no longer be a defining specification. Furthermore, ability to configure the weight capacity of a belt scale after its manufacture and at the time an order is received is equally important in maintaining flexibility in manufacturing. This later criterion has often been achieved in the past at the time of installing the weighing device, called a load cell, with the appropriate capacity for a particular user's needs. But the former criterion—no crossbar—has been somewhat more elusive in the past. The reason for relatively few belt scale weighframes without crossbars is as stated earlier—accuracy is sacrificed when this particular simplification is adopted. Hence the need for a general purpose belt scale that does not require a crossbar and can be configured for different full-scale belt loading is very obvious, but accuracy must not be compromised if this type of belt scale weighframe is to be successful.

The weighframe cited in U.S. Pat. No. 4,260,034 and shown in FIG. 1 addresses the need for low-cost manufacturing by using a pair of weight sensing load cells as the primary and only connecting link between the idler roll that supports the belt and the conveyor structural members. Therefore, the load cells must sustain not only the vertical downward forces due to the weight of the material transported by the belt, but also the horizontal and lateral forces exerted by the roller axle bearing ends on the load cells. Additionally, the load cells also must sustain twisting forces (called torsion) created by the twisting motion of the longitudinal conveyor supports (called stringers). This twisting action is due to uneven thermal expansion of the stringers caused by the sun during the daytime hours. All these forces generally have non-negligible effects on the load cells, such as output signal changes that are not related to any change in the weight of the material carried by the conveyor belt. Thus errors arise in measuring the weight. An extreme effect of these outside forces and twisting motions is premature failure of the load cells.

The weighing structure of U.S. Pat. No. 5,296,654, shown in FIGS. 2 and 3, is another such attempt at providing a low-cost belt scale without a crossbar to the in-plant inventory market. Here the cantilevered beams labeled 44 to which the strain-gage load sensors are attached must sustain the entire array of forces and torsion loading applied by the idler roll assembly, Similar to the previously cited prior art, these disturbances arise from the horizontal travel of the conveyor belt and its material loading as well as thermal expansion effects. Therefore, the strain-gage load sensors are influenced by disturbance effects not related to or caused by the downward-acting weight of the material on top of the belt. Just as in the previous apparatus, the results are errors in the output signal and, in some instances, premature failure of the sensors themselves. claim 1 in the cited patent specifically refers to measuring only the stresses due to material weight on the belt and isolating the cantilevered beams from " . . . shifting, twisting, and movement of the belt conveying means stringers . . . ". But the structure proposed to solve these problems does not in fact isolate the cantilevered beams and therefore the sensing elements as well from these error-generating forces and motions. Also, the mounting elements required to support the cantilevered beams and to secure them to the conveyor stringers are not at all simple to manufacture because of their multiplicity of direction changes—laterally in from the stringers, then vertically rising, then longitudinally forward, then back down, then forward again to support the idler roll assembly.

Throughout all these direction changes, parallel surfaces between the stringer mounting location and the idler roll assembly support must be maintained at the risk of creating some unwanted torsional twisting of the cantilever beams to which the weight sensors are attached. Also, alignment of the neutral axis plane identified as 42 in FIG. 2 with the top of the carry roll is not correct. The correct alignment is the plane 120 passing slightly above the axle 116 of the carry roll 24 in FIG. 5. Also, there is no provision in this structure for adjusting the vertical height of the carry roll 24 to match the vertical heights of adjacent upstream and downstream carry rolls. This alignment is essential for accurate belt scale weighing. Because there is no such adjustment provision, the installer must place shims between the belt scale marked 38 in FIG. 3 and the conveyor stringers 30. This shimming procedure is tedious and time consuming—not recognized as a user-friendly design.

In summary, the prior art falls short of providing a no-crossbar conveyor belt weighframe that meets the combined user and manufacturer criteria of reliability, accuracy, and manufacturing simplicity.

OBJECTS AND ADVANTAGES

It is an object of this invention to provide a general purpose belt scale weighframe that can be installed on conveyor belts without regard to belt width.

Another object is to create a weighframe that can be easily adapted to any one of a range of full-scale belt loading values after it has been manufactured.

An important object of this invention is to isolate the weight sensing mechanism from the array of forces and torques acting on the weighframe, except for the normal component of the material weight to be weighed by the scale, thereby increasing its weighing accuracy over that of existing no-crossbar weighframes.

Yet another object is to capture and secure the weigh idler roller assembly by the mechanical structure of the weighframe and not by the weight sensing means.

Still another object of the invention is to provide conveniently settable overload stops so that unanticipated large belt loads will not damage the weight sensors.

Another object is to include a convenient means for raising or lowering the idler roller assembly attached to and supported by the scale so as to bring it into close alignment with the adjacent upstream and downstream fixed idler roll assemblies.

Still another object of the invention is to enable the user to align the scale weigh idler with the adjacent idler assemblies by passing a string line underneath the center carry rolls of these three idler assemblies without the line being impeded by any of the scale's component parts.

Another object is to position the three-roll idler assembly so that the axle of the carry roll is nearly in the plane parallel to the conveyor structural support stringers and passing through the hinge line of the scale, thereby reducing errors due to torsional overturning effects.

BRIEF DESCRIPTION OF FIGURES

FIG. 2 shows a side view of one cantilever beam with stress sensors and FIG. 3 shows the same weighframe looking back along the conveying direction.

FIG. 8 alternative three-piece load beam design instead of a single-piece design.

DETAILED DESCRIPTION OF THE INVENTION

Figure 2:
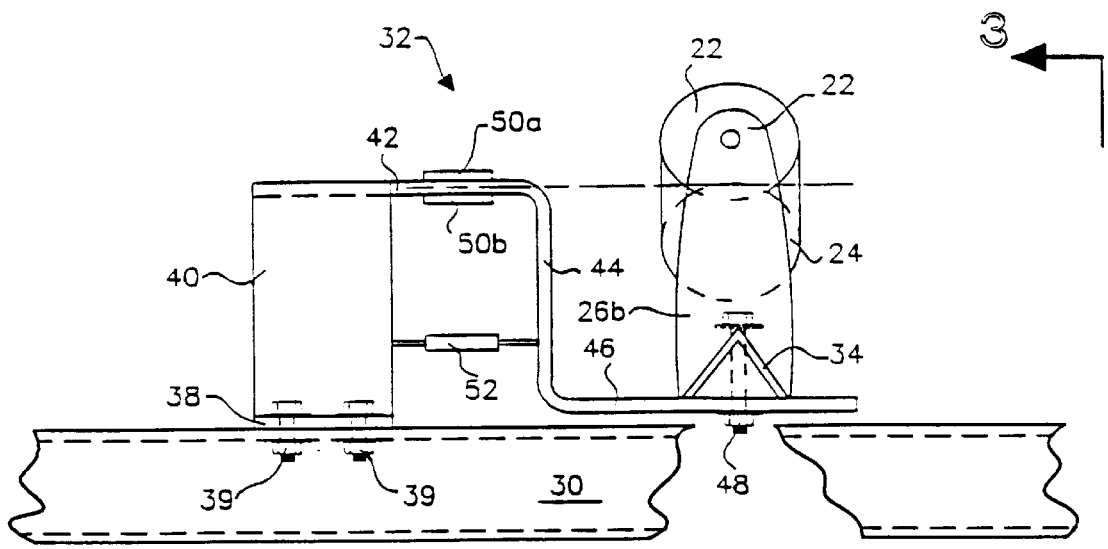
FIGS. 2 and 3 are taken from a recently patented no-crossbar weighframe where
Figure 3:
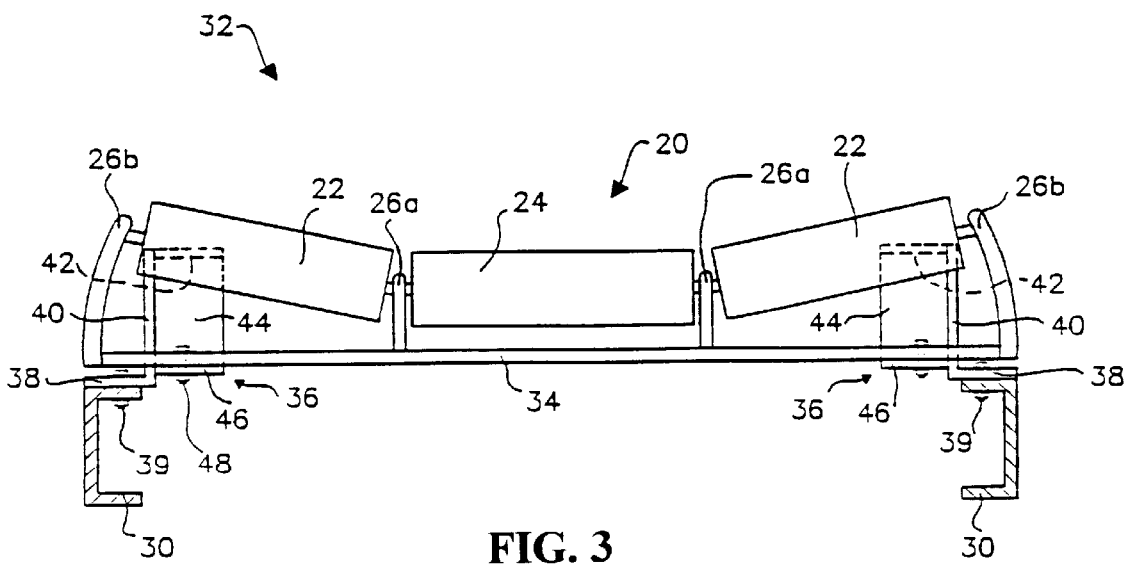
Figure 5:
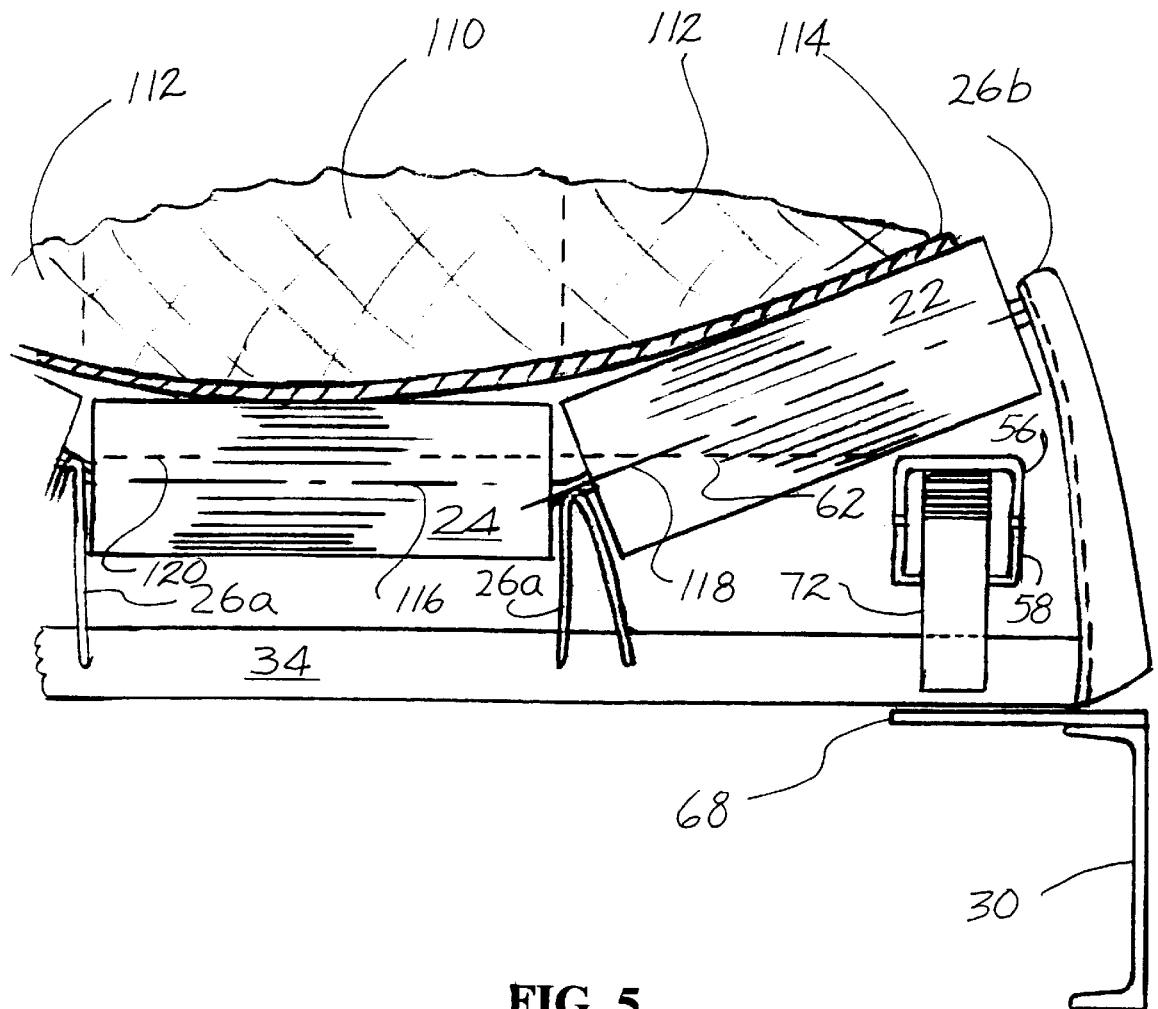
FIG. 5 shows the relationship between a belt loaded with material, the idler rolls supporting the belt, an end view of one load beam, and the best location for the plane through the weighframe's hinge line.

FIGS. 2 and 3 show the relative arrangement of a prior art weighframe used to weigh material being transported by a troughing-idler belt conveyor. Although these figures show only the weigh idler 20 supporting the belt and its load, it can readily be understood that the entire conveyor is comprised of idlers like the one shown supported by the weighframe. FIG. 5 also provides a picture of the weighing idler and its rolls supporting the belt and the material being transported. The other regularly-spaced idlers, mounted on the parallel stringers 30 comprising the conveyor's structure, are spaced vertically so that the belt 114 substantially forms a straight line from the belt's tail pulley to its discharge pulley. It can also be readily understood that the weight of the belt and its material loading 110, 112 carried by these discretely spaced idlers is thereby transferred through them to the conveyor stringers. Furthermore, an industrial-grade belt of this nature can be expected to have imperfections, tears, and other protrusions that cause and create forces and torques applied to the idler rolls in addition to the readily understood downward force due to the weight of the belt and its material loading. These additional forces, torques, and twisting motions are discussed in some detail in the context of FIG. 8. Suffice it to say at this point that a conveyor belt scale weighframe must have the capability to substantially respond only to the weight-induced forces—responses to these other forces are errors in the measured weight and flow rate.

This invention suggests a structure and spatial arrangement of that structure so as to minimize these error responses. This structure has two principal attributes that make it very attractive to the supplier-manufacturer of belt scales: a) it is a two-piece design consisting of two load beams, one load beam independently mounted on each of the conveyor's stringers, with no crossbar connecting the two halves of the weighframe; b) the full-scale weight capacity can easily be selected after the load beams have been manufactured by choosing the appropriate load cell weighing capacity at the time a customer places an order for a belt scale. Additional attributes that make this weighframe very attractive to the user that are at the heart of this invention are: c) means for isolating error-generating forces, torques, and twisting motions from the weight sensing means so that only the weight-created downward forces can cause the load cells to respond; d) correct spatial arrangement between the weighframe hinge line and the weigh idler carry roll so as to minimize and substantially eliminate errors induced by over-turning forces; e) convenient means for raising or lowering the weigh idler supported by the two load beams so as to bring about vertical alignment with upstream and downstream idlers.

Figure 4:
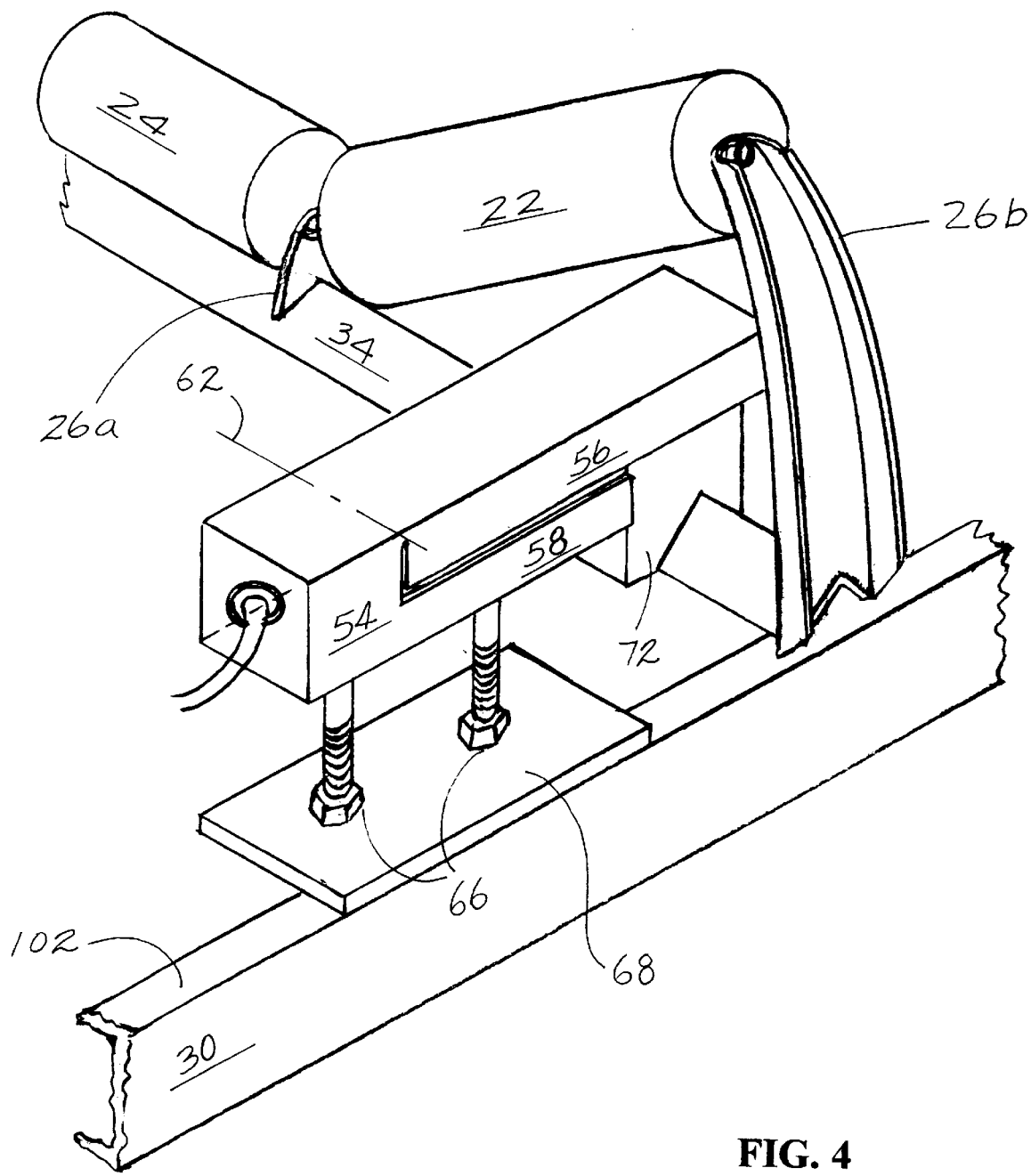
FIG. 4, from the current invention, shows an isometric view of one of two load beams mounted on one of two conveyor stringers and securing one end of the backbone of the weigh idler.

FIG. 4 shows one-half of a weighframe comprised of two load beams supporting and securing the right-hand end of its weigh idler. A one-piece load beam 54 made from a piece of tubing must be cut along 60 so that its upper half 56 would be reasonably free to bend about its hinge line 62. A force measuring means located between 56 and 58 prevents the upper and lower portions from bending together under loaded belt conditions. It is easily understood that element 54 could be fabricated of two pieces joined together at one end so that the cut line 60 would not be necessary to achieve essentially the same objective as the one-piece element 54 shown in FIG. 4. The lower portion 58 is rigidly secured to the conveyor stringer 30 by means of mounting bolts 64 extending through holes in mounting plates 68 and adjustment nuts 66. The mounting plates are welded or otherwise fastened to stringer 30. Thus each load beam is connected and thereby secured to the conveyor.

As shown in FIG. 5, the weight of material 110, 112 on top of belt 114 is transferred to support rolls 22, 24 and to the idler backbone 34 via support brackets 26a, 26b, which in turn transfers the weight to the outboard ends of the load beam upper portion 56. Lines 78 represent a multiplicity of shims so that the vertical height relationship between the hinge line 62 and the weigh idler carry roll 24 and its axle 116 can be correctly established and thereby substantially eliminate errors due to belt-induced overturning torque acting on the weigh idler carry roll. Because of the rising angles of the troughing rolls 22 and the material 112 carried by these two rolls, the hinge line 62 optimally lies in a plane parallel to stringers 30 and passing slightly above the carry roll axle 116, shown as line 120.

Figure 6:
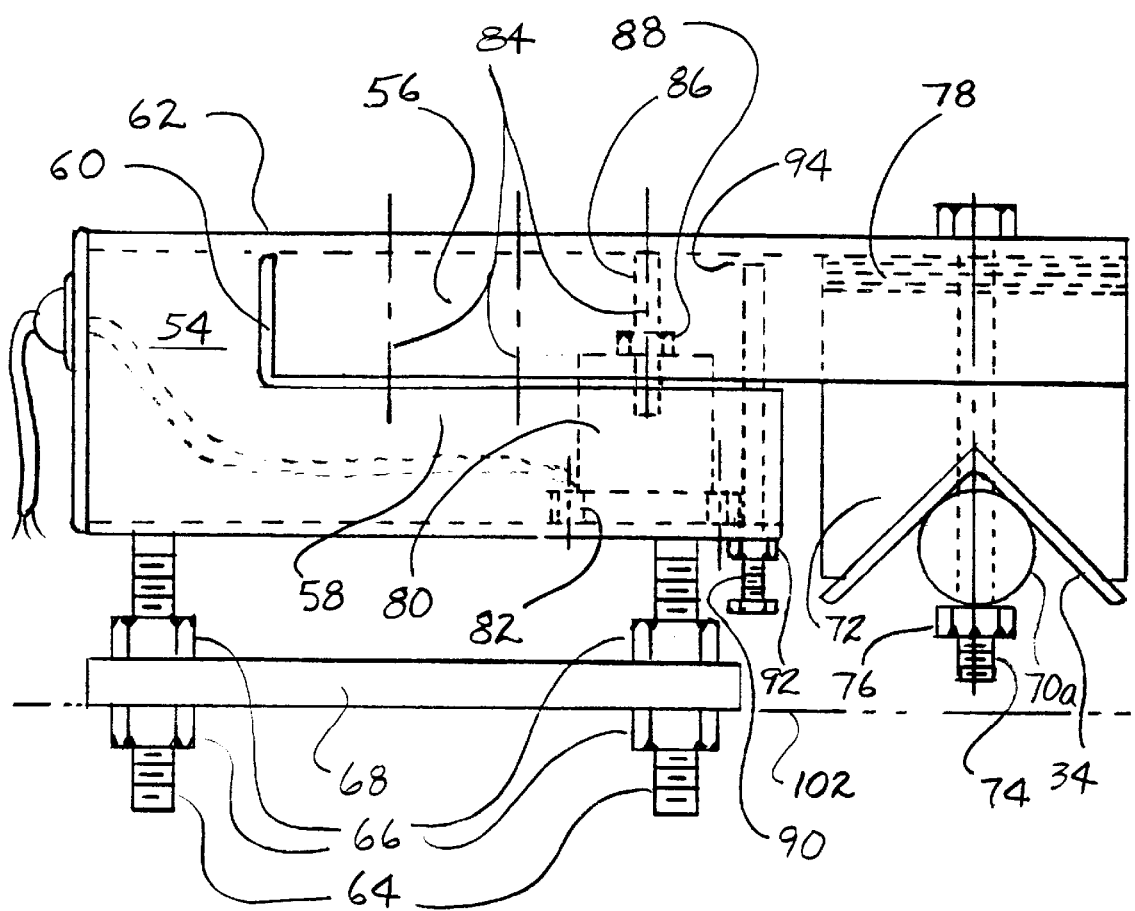
FIG. 6 shows a side view of the FIG. 4 load beam, exposing details including the cutting of the load beam to render it compliant in the weighing direction, placement of a load cell, mounting members that also provide vertical alignment adjustment, overload stop bolt, and means for attaching the idler backbone to the load beam.
Figure 7:
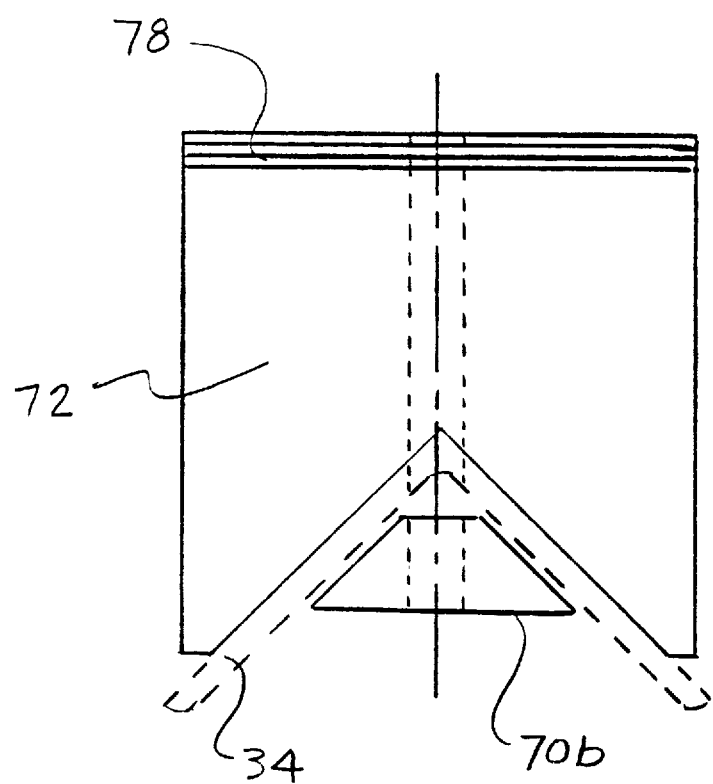
FIG. 7 shows the means for securing the weigh idler backbone to the load beam; also some alternative shapes for the retainer block.

FIG. 6 shows a side view of the load beam and its attachment to the weigh idler backbone 34 and to its mounting plate 68. Nuts 66 capture the load beam at any desired vertical height. Rotating all the nuts in on e direction raises the entire load beam assembly and the attached weigh idler. Alternatively, rotating all the nuts in the opposite direction lowers the load beam relative to the conveyor stringers, thereby permitting simple, fast, and reliable height adjustment of the weigh idler to ensure that the belt will travel across the weighframe and its weigh idler without deforming the belt in either an upward or downward direction. Either type of belt deformation at the weigh idler would cause inaccuracy in the weighing of the material transported by the conveyor belt. The weigh idler backbone 34 is secured to the load beam upper portion 56 by threaded bolt 74. When nut 76 is tightened, backbone 34 is drawn up against V-block 72 by a cylindrical retainer block 70a. Thus the weight of the material pulls down on portion 56 through bolt 74 and nut 76. FIG. 7 shows an alternative shape for the retainer block; namely, a parallelogram 70b. Still other shapes for the retainer block are envisioned, such as a sphere.

As previously mentioned, 56 would collapse against 58 under loaded belt conditions were it not for the load cell 80 and force and torque isolator 86 situated between upper and lower portions 56 and 58. ('Force and torque isolator' is henceforth abbreviated to "Force Isolator'.) Holes 82 in the base of the load cell are used to secure it to the load beam's lower portion 58. Force isolator 86 is screwed or otherwise attached to the upper portion of the load cell and is adjusted so that it bears against the underside of load beam portion 56, thereby transferring the belt loading from upper portion 56 through member 86 and onto the top of the load cell. Nut 88 locks isolator 86 to the load cell and thus prevents the isolator from inadvertently turning loose. With the lower end of the force isolator attached to the load cell and its upper end simply touching the underside of the load beam, the only force component that can be transmitted to the upper face of the load cell is the downward-acting weight of the loaded belt—the one and only force that an ideal weighframe is intended to measure. Item 86 is called a 'force and torque isolator' because it isolates all extraneous forces and twisting deflections from the load cell. If it were not for this force isolator, significantly larger weighing errors would occur. Further discussion regarding the function of the force isolator is presented in the context of FIG. 8. Overload stop bolt 90 is adjusted to an allowable gap 94 the prevent excessive compressive displacement of the load cell. Locking nut 92 prevents the stop bolt adjustment from changing inadvertently.

Figure 8:
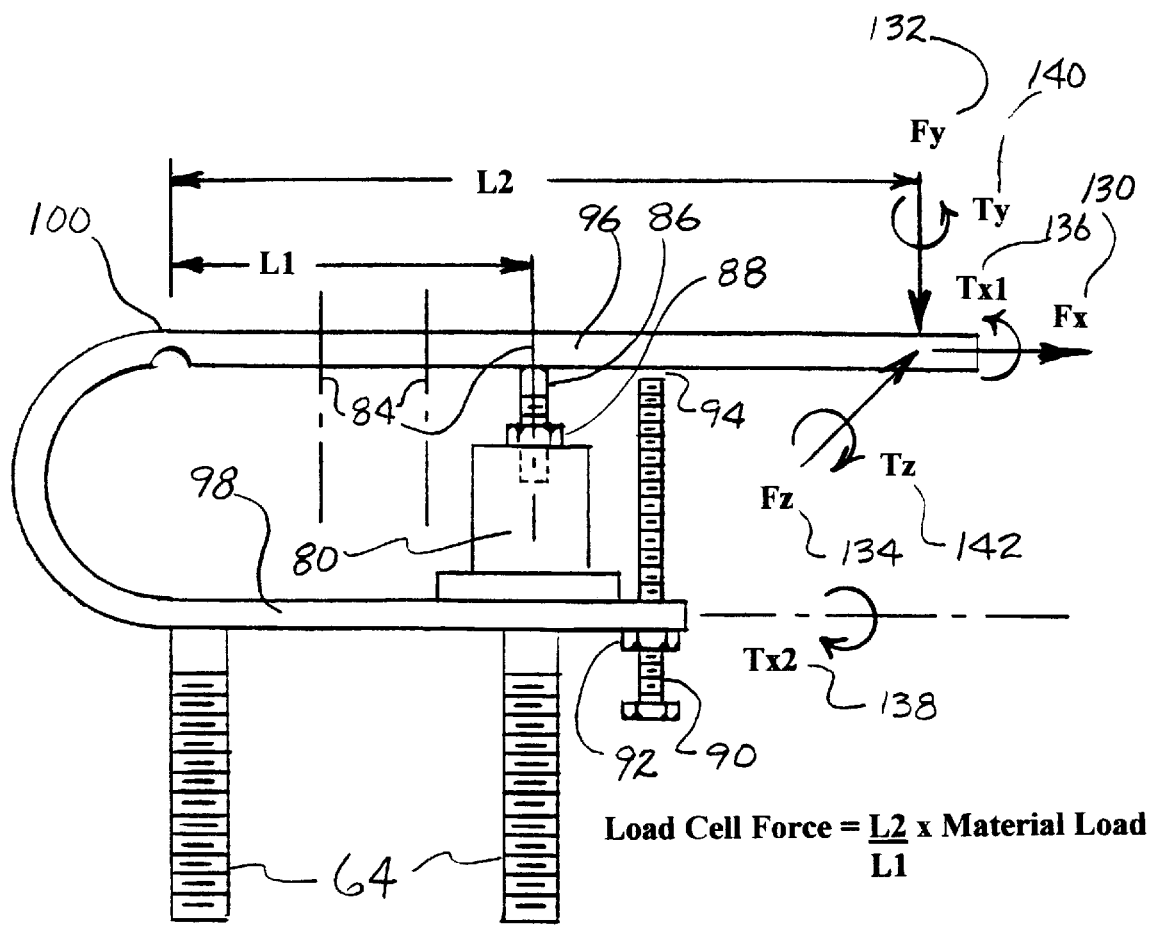
FIG. 8 is an abstract view of the load beam in FIG. 6 to illustrate the array of forces, torques, and twisting motions that the load beam experiences in conveyor weighing applications, also, its essential similarity to a C-shaped structure.

FIG. 8 shows an abstract side view of the load beam of FIG. 6. This figure illustrates that the load beam described in this invention is essentially a C-shaped frame with a designed-in line of flexibility 100 that corresponds to line 62 in FIG. 6 and that stiffness is provided by a load cell 80 and a force isolator 86 interposed between upper portion 96 and lower portion 98, and not by the structural rigidity of the C-frame itself Also illustrated here is the mechanism whereby a load cell 80 of a specific load capacity can be shifted along the length of the load beam in order to select the correct proportion of the material load to be applied to the load cell. Three specific mounting locations for this single load cell are all designated 84, each being a distance L1 away from the load beam's hinge line. It is to be understood that the length L1 is a variable that, as shown in FIG. 8, can take on any one of three values. The length L2 remains fixed. Note that the length L2 remains fixed. Note that the load cell force is related to the material load by the ratio L2/L1, and that changing the load cell position changes the proportion of the material weight. This variability in load cell installation position provides a second means of setting up the weighframe for a customer's belt conveyor load range after the load beams have been manufactured. Elsewhere it was mentioned that this same objective could be accomplished by selecting the appropriate load cell weight capacity. Both methods have a place in the manufacture and marketing of belt scales.

Figure 1:
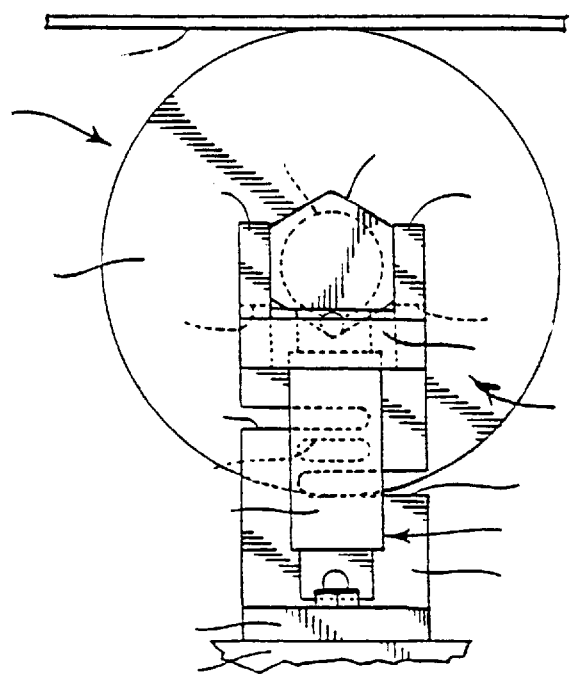
FIG. 1 is a side view of a prior art no-crossbar weighframe where the weigh idler is entirely secured by two load cells, one on either side of the conveyor.

FIG. 8 also shows the array of forces and torques applied to the upper and lower portions of the load beams containing the load cells. For example, force Fy 132 is caused by the material load on the belt and is therefore the force to be measured by the belt scale, Ty 140 is a disturbance torque about the y-axis in line with the force Fy. Similarly, Fz 134 and Tz 142 are a disturbance force and a torque about the transverse z-axis; Fx 130, Tx1 136, and Tx2 138 are disturbances in and about the x-axis, in the direction of belt travel. The disturbance torques Tx1 and Tx2 are better understood as twisting deflections of the upper and lower members of the load beam. These two twisting disturbances are especially troublesome in a no-crossbar weighframe because they are frequently present in sufficient magnitude to cause weighing errors. Tx1 arises when the weigh idler backbone deflects due to the material load on top of the belt; Tx2 occurs when the sun heats the conveyor stringers non-uniformly and one or both stringers respond by twisting. If the present invention would have its load cell rigidly secured to both top and bottom members 96 and 98, the load cell itself would suffer internal bending or twisting deflection between its top and bottom members. Similarly, the inventions pictured in FIGS. 1, 2, and 3 experience this twisting deflection of their weight sensors; and weight sensing devices operate most accurately when they are strained only along their primary measurement axis.

The present invention described herein introduces an additional component, the force and torque isolator, to prevent these unavoidable disturbance forces and torques from being transmitted to the load cell, except for the disturbance torque Tz 142. But this transverse disturbance torque can be reduced to an insignificant level if shim stack 78 is properly used. As an example, if either Tx1 or Tx2 are present, the contact point of force isolator 86 acts as a pivot point for these disturbance deflections. Therefore it is not possible for the twist to act on the load cell itself Similarly, a disturbance force Fx cannot be transmitted across the force isolator contact point to the top of the load cell. However, the force Fy 132 to be sensed and measured by the load cell most certainly does cross the force isolator contact point boundary and acts on the load cell.

From the foregoing description it can be understood that the primary purpose of the load beams is to restrain and secure the weigh idler in all directions of response to the vagaries of the force and torque disturbances at work except in and along the principal axis of the load cell, which is arranged so as to measure the downward-acting forces due to the weight of the material being carried by the conveyor belt.

Figure 9:
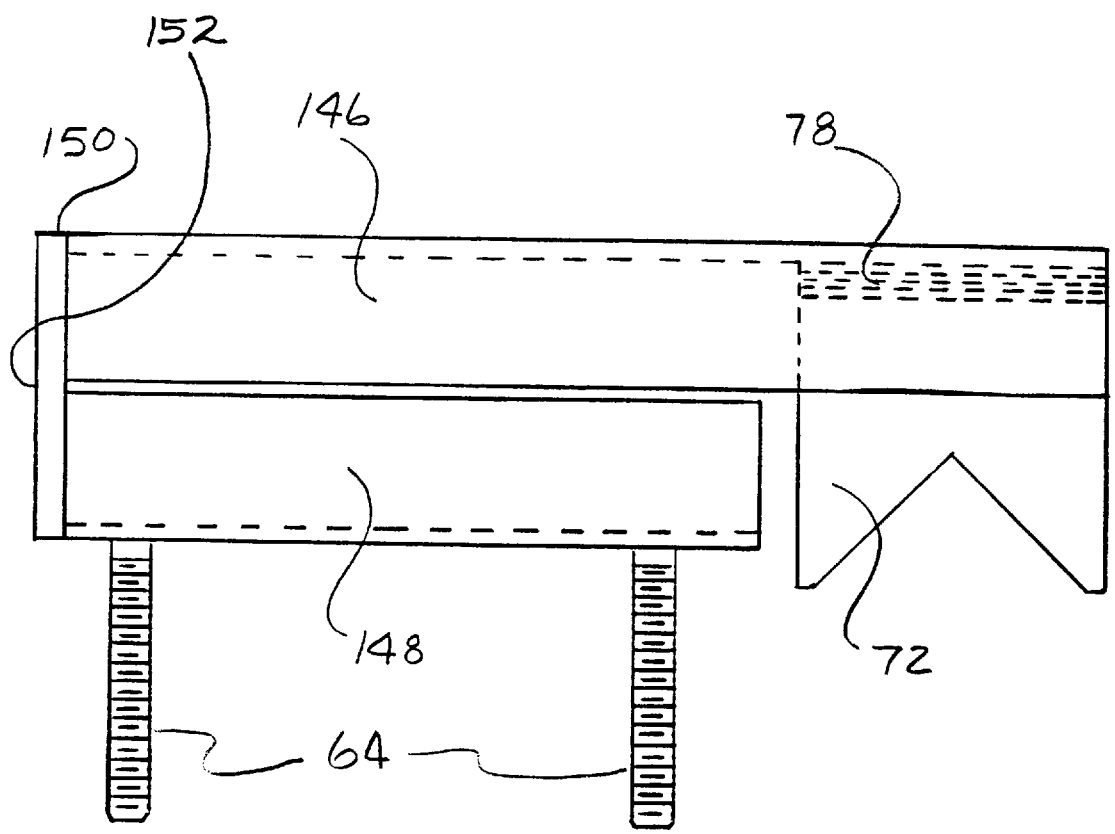

FIG. 9 shows an alternative method of constructing a load beam. Instead of a single piece of tubing, this figure shows two separate pieces 146 and 148 with a flexible connecting link 150. Hinge line 152 takes the place of hinge line 62 in the one-piece load beam.

SUMMARY AND CONCLUSIONS

From the previous description the reader can readily understand that a general purpose belt scale weighframe without a crossbar but with the numerous and special features described herein combines the best interests of both the manufacturer and user. The special feature called the force and torque isolator is an especially necessary and vital component to enable a no-crossbar design to work with expectation of satisfactory accuracy. While the specifics of this invention have been carefully stated and illustrated, these specific renditions should not be construed as limitations to the scope of this invention. For example, the force isolator is shown to be attached to the top of the load cell and is only in touch contact with the top portion of the load beam. But the force isolator can also be attached securely to the top portion of the load beam and in touch contact with the top of the load cell. Similarly, the base of the load cell could be attached to the top rather than the bottom of the load beam with the force isolator in touch contact with the bottom portion of the load beam. Accordingly, the scope of this invention should be determined not by the illustrated embodiment, but by the accompanying claims.

I claim:

1. A general purpose conveyor belt scale for weighing material in transit on a conveyor belt, comprising:
   a pair of parallel support stringers providing structural support for a belt conveying means;
   a pair of load beams, each having two portions, and a hinging means connecting the two portions and being mounted with one portion secured to one support stringer and the other portion securing a weigh idler assembly with a set of rolls that support said conveyor belt;
   a sensing means and a disturbance force and torque isolating means positioned between the two portions of said load beam to measure material weight passing over said weigh idler assembly in such a manner that said sensing means and said force and torque isolating means are fixedly attached to each other and are fixedly attached to one portion of said load beam and are in contact with but are not attached to the other portion of said load beam, thereby rendering said sensing means substantially responsive only to the material weight and not to the disturbance forces and torques.

2. A general purpose belt scale according to claim 1 wherein the sensing means is comprised of a pair of load cells connected between opposing portions of the C-shaped load beams for measuring force exerted by the material weight in transit on the conveyor belt, wherein one portion of the load beam is very flexible relative to the second portion about the hinge axis, and stiffness between the two is maintained by an inherently high stiffness of the load cell connected between the two portions.

3. A general purpose belt scale according to claim 2 comprised of two load beams, each having a load cell that can be selected and mounted so that the two load beams together have the correct force capacity for the weight being carried by the belt.

4. A general purpose belt scale according to claim 2 comprised of two load beams, each having a load cell that can be mounted longitudinally along the length of the load beam at any one of several locations, thereby selecting a portion of the force caused by the weight of material on the conveyor belt that nearly matches the capacity of a pre-selected load cell, and thus improving the accuracy of the material weight measurement.

5. A general purpose belt scale according to claim 2 wherein an adjustable threaded bolt and jam nut with settable gap is positioned between opposite portions of each C-shaped load beam, thereby creating an overload stop to prevent destruction of the load cell when unusually heavy loading on the conveyor belt supported by the weigh idler occurs.

6. A general purpose belt scale according to claim 1 wherein the sensing means is comprised of a pair of load cells connected between opposing portions of the C-shaped load beams for measuring the force exerted by the material weight in transit on the conveyor belt, and one of the connective elements is a force and torque isolator mechanism that prevents unwanted disturbance forces and torques not related to the material weight from being transmitted to the load cell, thereby substantially reducing weight measurement errors.

7. A general purpose belt scale according to claim 6 wherein each load beam is a protective shell surrounding the load cell in such a manner that the shell sustains all of the disturbance forces and torques, while isolating the load cell from all forces except the force caused by the weight of the material to be measured on the conveyor belt, thereby prolonging the accuracy and the life of the load cell.

8. A general purpose belt scale according to claim 1 wherein each load beam has mounting bolts passing through a mounting plate secured to the stringers, and by rotating threaded nuts the load beams together with their weigh idler can be vertically adjusted so that the weigh idler carry roll is aligned with the carry rolls of adjacent idlers, thereby eliminating the need for additional spacer elements to make the vertical adjustment.

9. A general purpose belt scale according to claim 8 wherein the load beams, their mounting plates, and their weigh idler attachment fixtures are entirely above the plane defined by the top surfaces of the two parallel support stringers, except for the mounting bolts passing through the mounting plates; thereby eliminating the need for modifying conveyor struts and braces passing between the two parallel support stringers normally found in conveyors of this type.

10. A general purpose belt scale according to claim 1 wherein the weigh idler point of attachment to the load beam is comprised of a stack of shims and a capture bolt and nut so that the height of the weigh idler carry roll axle can be positioned in close proximity to the load beam hinge axis, thereby substantially eliminating measurement errors due to overturning forces and torques.

11. A general purpose belt scale according to claim 1 comprised of two load beams separately mounted on the two stringers, thereby allowing a stringline to pass between the two load beams and beneath the weigh idler carry roll without being impeded by a crossbar, and thus enable vertical alignment of the weigh idler carry roll with adjacent idler carry rolls without lifting the conveyor belt from the weigh idler and adjacent idlers.

12. A general purpose belt scale according to claim 1 comprised of two load beams, each load beam having been manufactured from a single piece of tubing, and each having been cut so as to create flexibility between two portions of the tubing only in one direction corresponding to the material weight direction, without separating the two portions from each other.

13. A general purpose belt scale according to claim 1 wherein the two load beams each have a separate upper and lower portion flexibly joined together so that stiffness between the two portions is maintained by the stiffness of the load cell connected between the two portions.

14. A general purpose belt scale according to claim 1 wherein the load beams are comprised of two separate pieces joined by a third connective piece that is flexible.

15. A general purpose conveyor belt scale for weighing material in transit on a conveyor belt, consisting of:
   a pair of parallel support stringers that provide a structural support for a belt conveying means;
   a pair of load beams, each having two portions, and a hinging means connecting the two portions and being mounted with one portion secured to one support stringer and the other portion securing a weigh idler assembly with a set of rolls that support said conveyor belt;
   a sensing means and a disturbance force and torque isolating means positioned between the two portions of said load beam to measure material weight passing over said weigh idler assembly in such a manner that said sensing means is fixedly attached to one load beam portion and said disturbance force and torque isolating means is fixedly attached to the other load beam portion, and are in contact with each other but are not attached to each other thereby rendering said sensing means substantially responsive only to the material weight and not to the disturbance forces and torques;
   a multiplicity of mounting locations for said sensing means and said force and torque isolating means so that a proportion of the material weight to be sensed by said sensing means can be selected, thereby enabling selection of the sensitivity of said sensing means in advance of knowledge about the largest weight of material to be weighed by the conveyor belt scale.

* * * * *